Figure 1:
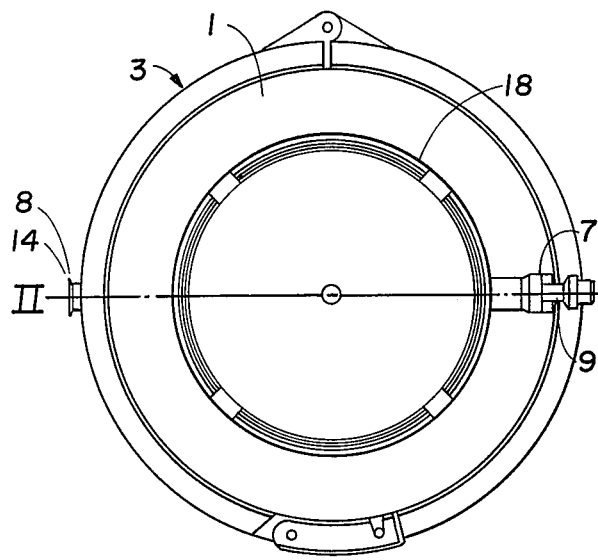

United States Patent [19]
Schmid et al.

[11] 3,897,342
[45] July 29, 1975

[54] DEVICE FOR FILTERING AND/OR TREATING LIQUID OR GASEOUS MEDIA

[75] Inventors: Paul Schmid; Albert Droesch, both of Riehen, Switzerland

[73] Assignee: GHH Basel AG, Basel, Switzerland

[22] Filed: Nov. 2, 1973

[21] Appl. No.: 412,412

[30] Foreign Application Priority Data
Feb. 21, 1973 Switzerland.......................... 2467/73

[52] U.S. Cl................................. 210/445; 210/136
[51] Int. Cl............................................. B01d 27/08
[58] Field of Search............................ 210/136, 445

[56] References Cited
UNITED STATES PATENTS
3,085,684  4/1963  Hering et al.................... 210/445 X
3,184,064  5/1965  Sampson et al................... 210/136

*Primary Examiner*—Frank A. Spear, Jr.
*Attorney, Agent, or Firm*—Kurt Kelman

[57] ABSTRACT

A fluid medium filter comprising a shell-shaped inlet housing portion and a shell-shaped outlet housing portion. A filter is dismountably inserted between the two portions and supported on two plates, each supporting plate being supported in the interior of a respective housing portion and defining a cavity for receiving a part of the filter. Two nipples extend from the filter insert, one of the nipples passing through one supporting plate into the inlet end and the other nipple passing through the other supporting plate into the outlet end, the inlet and outlet ends defining limited spaces for receiving the respective nipples. Fluid-tight seals in the limited spaces seal the inlet and outlet ends.

4 Claims, 6 Drawing Figures

PATENTED JUL 29 1975

3,897,342

DEVICE FOR FILTERING AND/OR TREATING LIQUID OR GASEOUS MEDIA

The present invention relates to a device for filtering and/or treating liquid or gaseous media, having a filter element or treatment insert which is inserted, in a dismountable manner, between a shell-shaped lower housing portion and a shell-shaped upper housing portion.

Among the devices for filtering and/or treating liquid or gaseous media, a device has already become known having a pressure-tight housing and a one-part or multipart filter element which is inserted between a lower housing portion and an upper housing portion and which is particularly suitable for filtering liquids, preferably water. In this known device, the lower housing portion has a cavity which centres the filter element and is bounded by an encircling edge and which contains a plurality of first bearing surfaces which support the filter element at least in its marginal region and form first sealing zones in relation to its inlet side for the raw medium, the cavity in the lower housing portion being divided by partitions into a plurality of chambers which are in communication with one another through connecting passages. In this case, at least one of these chambers is connected to a raw-medium supply pipe and the upper housing portion is provided with a cover flange which bears in a pressure-tight manner against the rim of the lower portion. Provided in the lower housing portion are a plurality of second bearing surfaces forming second sealing zones against the first bearing surfaces at least in the marginal region of the filter element and with respect to its outlet side for the medium, and the upper housing portion contains a connection device for the medium outlet on the filter element. The device is connected to a medium discharge pipe, and means are provided whereby on the one hand the peripheral sealing surfaces of the lower housing portion and of the upper housing portion are urged against one another in a pressure-tight manner and on the other hand said first and second bearing surfaces are urged in a pressure-tight manner against the inlet side for the raw medium and the outlet side for the medium respectively, of the filter element.

Because, when using a filter element which has only a single inlet for the medium, a considerable simplification can be achieved in the problems regarding the sealing both between housing portions and the filter element and of the housing with respect to the outside, it is advisable to select a housing construction corresponding to this possible simplification.

It is therefore the object of the present invention to provide a device of the kind referred to at the beginning, which renders possible easier handling in comparison with the known device described and a mode of operation which is less liable to trouble.

The device according to the invention for filtering and/or treating liquid or gaseous media, having a filter element or treatment insert inserted in a dismountable manner between a shell-shaped lower housing portion and a shell-shaped upper housing portion, has a lower housing portion with a first cavity section which is provided to receive partially the filter element or treatment insert, and the plan surface of which is formed by a first supporting plate which is supported on stiffening ribs forming partitions in the interior of this housing portion, and comprises a connection point for a supply pipe conveying an unpurified or untreated medium, that the upper housing portion has a second cavity section which is provided to receive the rest of the filter element or treatment insert, and the plan surface of which is likewise formed by a second supporting plate which is supported on stiffening ribs forming partitions in the interior of this housing portion, and comprises a connection point for a medium discharge pipe delivering a filtered or treated medium, and a device is provided which connects the lower housing portion and the upper housing portion to one another so that the filter element or treatment insert inserted between the two housing portions is connected in a pressure-tight manner both to the medium supply pipe and to the medium discharge pipe.

Figure 2:
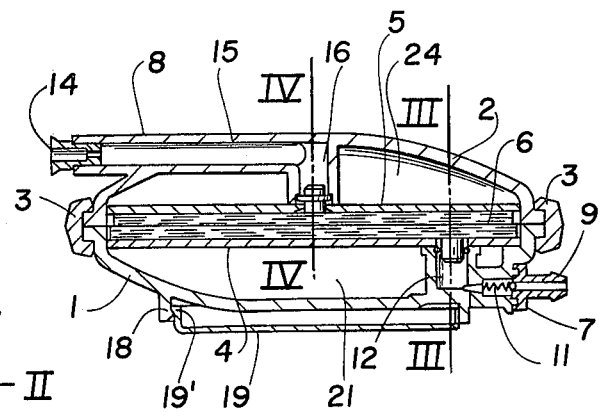
Figure 3:
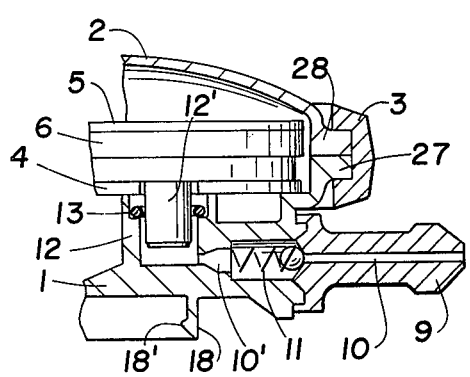
Figure 5A:
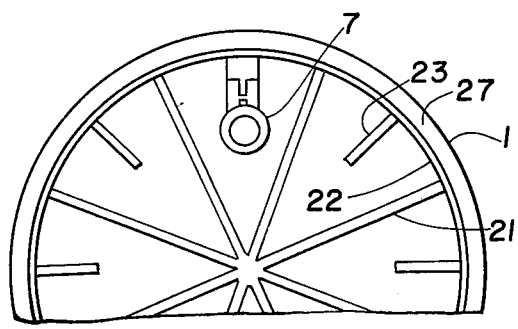
Figure 4:
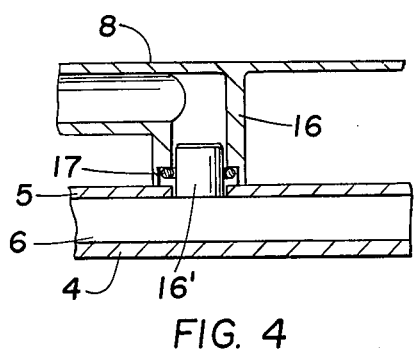
Figure 5B:
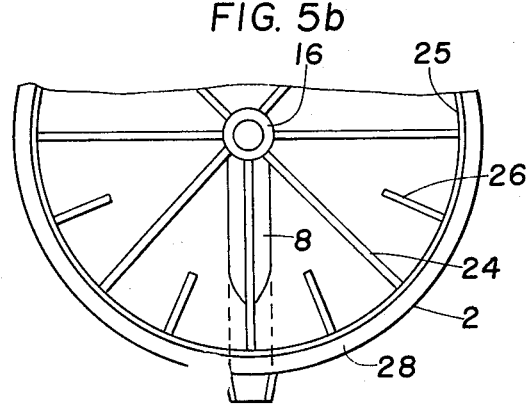

One example of an embodiment of the invention is described below, by way of example, with reference to the accompanying drawings, in which:

FIG. 1 shows a device according to the invention in plan view, seen from the inlet side for the raw medium or installation side, FIG. 2 shows a section on the line II—II of FIG. 1, through a device equipped with a one-part filter element, FIG. 3 shows a section on the line III—III in FIG. 2, FIG. 4 shows a section on the line IV—IV in FIG. 2, and FIGS. 5a and 5b show partial plan views of the housing portion at the inlet side (a) and the outlet side (b), seen from the inside and with the filter supporting plate removed.

In FIGS. 1 and 2, 1 designates the lower housing portion, 2 the upper housing portion and 3 a locking ring of a device according to the invention, which holds the two housing portions 1 and 2 together. Between supporting plates 4, 5 of the lower housing portion 1 and of the upper housing portion 2 respectively is a filter element or treatment insert 6, which can be exchanged after use or exhaustion of the filtering or treatment capacity, and the opposite lateral faces of which are supported by the supporting plates 4, 5.

For the sake of simplicity, only "filter element" will generally be written below, while the expression can, of course, be replaced by "treatment insert."

The lower housing portion 1 is provided with a raw medium inlet which is designated in general by 7, while an outlet 8, which delivers filtered or treated medium, is provided on the upper housing portion 2.

In the embodiment shown, and as can be seen better in the enlarged illustration of FIG. 3, the raw medium inlet 7 consists of a connection nipple 9 for a flexible supply pipe, not shown, an inlet bore 10, 10' with a non-return valve arrangement 11 (ball and spring), a filter nipple bush 12 which is disposed eccentrically and in the bore of which an O-ring seal 13 is accommodated in a seating not designated and serves as a sealing member between the filter nipple 12' and the filter nipple bush 12. Said non-return valve arrangement is intended to prevent, in the event of disappearance of the pressure of the inflowing medium, on the one hand particles of dirt already deposited at the raw medium side from flowing back into the raw medium supply pipe, and on the other hand filtered or treated medium from passing through the filter again in the reverse direction. The outlet 8 comprises an outlet nipple 14, for example for the connection of a flexible tube with a tap (not shown) or another end piece, an outlet socket 15 and a filter nipple bush 16 disposed concentrically. This latter detail can be seen on a larger scale in FIG. 4, in which the outlet filter nipple 16', disposed centrally in this example, is surrounded by an O-ring seal 17 to establish a medium-tight connection between the filter element 6 and the outlet 8.

The filter nipples 12' and 16', together with the filter nipple bushes 12 and 16, are so constructed, with the interposition of the O-ring seals 13 and 17, that under normal operating conditions, plus a reasonable safety factor, the passage of raw medium to the medium outlet side, by-passing the filter element, is excluded. The arrangement of the O-ring seals is such that they are sure to remain within the sealing region of the nipple bush bore during a change of filter. As shown in FIGS. 3 and 4, the structure is such that the edge of the through bores for the filter nipples in the supporting plates 4, 5 (inlet and outlet point) projects inwards beyond the O-ring seating so that an annular groove is formed in which the O-ring is held reliably during the change of filter.

The lower housing portion 1 is provided with a mounting flange 18, the inside of which carries a clamping device which, in the form of individual projections or an encircling bead 18' (FIG. 3), is intended to engage in a correspondingly constructed opposite part on a wall mounting plate 19 (FIG. 2). This last-mentioned plate can be permanently connected to a wall by adhesion or by mechanical means and is shown in FIG. 2 with a substantially cylindrical clamping flange 19' which is capable of establishing a rigid connection with the lower housing portion 1 or the mounting flange 18 either by spring action or by the engagement of projections.

In order to impart an optimum rigidity to the housing of shell-shaped construction, with the minimum possible weight, the portions of space in the interior of the housing which are not occupied by the filter element are provided with stiffening members, as can be seen for example from FIGS. 5a and 5b. These two figures each show a partial illustration in plan view with the filter supporting plate removed or not yet mounted. In FIG. 5a, the lower housing portion 1 is shown with the raw water inlet 7, stiffening ribs 21 which traverse the whole diameter of the shell and radial partial ribs 23 which extend to the edge 22 of the shell being provided. The height of these ribs originating from the bottom of the shell is selected so that their upper ends reach as far as the supporting plate 4. In this manner, the ribs 21, 23 form a satisfactory base for the supporting plate 4 (FIGS. 2, 3). FIG. 5b shows the lower portion 2 of the housing with the outlet 8 for the filtered or treated medium, stiffening ribs 24 which traverse the whole shell diameter and originate from the nipple bush 16, and radial partial ribs 26 reaching as far as the edge 25 of the shell again being provided. These ribs also start from the bottom of the shell and end at a uniform height so as to serve as a base for the supporting plate 5 (FIGS. 1, 4). In order that, on the one hand, the latter may not be lost and on the other hand, the edges of the through bores provided in the plates 4, 5 for the filter connection nipples 12', 16' may be able to fulfil their purpose as holding means for the O-ring seals 13, 17, the supporting plates are preferably welded or otherwise affixed to the ribs.

The stable base for the supporting plates 4, 5 provided in this manner ensures that the opposite filter cover plates are not deformed, even with an excessively high pressure of the raw medium, and damage to the filter block is thus practically excluded.

As a result of the eccentric arrangement of the raw medium inlet 7 on the one hand, and the concentric arrangement of the medium outlet, correct insertion of the filter element 6 between the housing portions 1 and 2 is enforced; that is to say, with correct connection of the inlet and outlet fittings to the housing of the device, the correct direction of flow of the medium in the filter element 6 is also automatically obtained. Nevertheless, as a result of the centrally disposed outlet nipple and the axially symmetrical construction of the halves of the housing, it is possible to select the direction of the supply and discharge pipes substantially as desired because the halves of the housing can be adaped for pivoting in relation to one another as desired. There is a restriction on this free pivotability when a swivel lock is provided between the upper and lower portions of the housing to relieve the load on the locking ring 3, which in principle need only be designed for the mutual securing of the halves of the housing. Such locking means may be so adapted that the mutual pivotability is restricted to steps of 30°, 45° or 60° for example.

Although a locking ring 3, by means of which clamping flanges 27, 28 are pulled snugly together, is shown for the mutual pivotable securing of the halves of the housing in FIGS. 1, 2 and 3, other forms of construction are adapted to achieve the same effect. It shoud be noted that it is unnecessary, and in some circumstances is actually inadvisable, to make the connection between the two halves of the housing pressure-tight. If a leak should occur either at the raw-medium inlet or at the outlet for the filtered or treated medium, such medium can escape from the device if the fit between the halves of the housing is not pressure-tight, and flooding of the interior of the device can be effectively prevented as a result.

In order to protect the filter element 6 in a suitable manner from excessively high pressures of the raw medium, which include pressure surges, relief-valve means, which are not shown and the response threshold of which may possibly also be adjustable in order to achieve a maximum filter throughput per unit of time, may appropriately be connected to the chamber which contains the non-return valve arrangement 11.

Although in the embodiment of the subject of the invention shown, the raw-medium feed is provided eccentrically with respect to the housing while the extraction of the filtered or treated medium is effected in the centre, the function of the two connection points may be exchanged if the filter element to be used is constructed accordingly.

We claim:
1. In a device for treating a fluid medium, which comprises two shell-shaped housing portions, one of the housing portions having an inlet for the fluid medium to be treated, the fluid medium inlet having an end within the one housing portion, another one of the housing portions having an outlet for the treated fluid, the fluid medium outlet having an end within the other housing portion, and a fluid medium treatment insert dismountably inserted between the housing portions and disposed between the inlet and outlet ends, the improvement of

1. two supporting plates for the treatment insert, a. each supporting plate being supported in the interior of a respective one of the housing portions and
b. each supporting plate defining a cavity for receiving a part of the treatment insert whereby the insert is held between the supporting plates, 2. two nipples extending from the treatment insert,
   a. one nipple passing through one of the supporting plates into the inlet end and the other nipple passing through the other supporting plate into the outlet end, and
   b. the inlet and outlet ends defining limited spaces for receiving the respective treatment insert nipples, and 3. fluid-tight sealing means in the limited spaces for sealing the inlet and outlet ends.

2. In the fluid medium treating device of claim 1, one of the ends being disposed eccentrically and the other end being disposed concentrically in the housing portions.

3. In the fluid medium treating device of claim 1, two bushes integral with housing portions and respective defining the limited spaces for receiving the respective treatment insert nipples, and the fluid-tight sealing means comprising sealing members seated in the bushings adjacent a respective one of the supporting plates.

4. In the fluid medium treating device of claim 1, a connecting flange on one of the housing portions and means on the connecting flange for releasably mounting the one housing portion on a mounting element.

* * * * *